(12) United States Patent
Rydén et al.

(10) Patent No.: US 12,389,278 B2
(45) Date of Patent: Aug. 12, 2025

(54) MANAGING A NODE IN A COMMUNICATION NETWORK

(71) Applicant: Telefonaktiebolaget LM Ericsson (publ), Stockholm (SE)

(72) Inventors: Henrik Rydén, Stockholm (SE); David Sandberg, Sundbyberg (SE); Mats Zachrison, Örebro (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 351 days.

(21) Appl. No.: 17/920,170

(22) PCT Filed: Apr. 22, 2020

(86) PCT No.: PCT/SE2020/050408
§ 371 (c)(1),
(2) Date: Oct. 20, 2022

(87) PCT Pub. No.: WO2021/215976
PCT Pub. Date: Oct. 28, 2021

(65) Prior Publication Data
US 2023/0164629 A1    May 25, 2023

(51) Int. Cl.
*H04W 28/08*    (2023.01)
*H04B 7/06*    (2006.01)

(52) U.S. Cl.
CPC ...... *H04W 28/0942* (2020.05); *H04B 7/0617* (2013.01); *H04W 28/08* (2013.01)

(58) Field of Classification Search
CPC . H04W 28/0942; H04W 28/08; H04W 24/04; H04W 40/18; H04W 72/27;
(Continued)

(56) References Cited

U.S. PATENT DOCUMENTS

| 10,271,333 | B2 | 4/2019 | Cui et al. |
| 10,327,112 | B2 | 6/2019 | Fjelberg et al. |

(Continued)

FOREIGN PATENT DOCUMENTS

| CN | 103247177 B | 1/2016 |
| CN | 109492814 A | 3/2019 |

(Continued)

OTHER PUBLICATIONS

European Extended Search Report dated Dec. 13, 2024 for Application No. 20932546.3, consisting of 10 pages.
(Continued)

*Primary Examiner* — Kenneth T Lam
(74) *Attorney, Agent, or Firm* — Weisberg I.P. Law, P.A.

(57) ABSTRACT

A method for managing a first node in a communication network is disclosed, wherein the first node is operable to exchange traffic flows with other nodes in the communication network. The method includes using a Variational Autoencoder (VAE) to generate a predicted traffic distribution for the first node, wherein the VAE has been trained using information about historical data flows exchanged by the first node with at least one other node in the communication network, and configuring at least one radio resource parameter of the first node based on the obtained predicted traffic distribution for the first node. Also disclosed are a method including training a VAE and nodes and a computer program product suitable for carrying out such methods.

19 Claims, 15 Drawing Sheets

(58) Field of Classification Search
CPC ..... H04W 28/26; H04W 24/02; H04W 76/15; H04B 7/0617; H04B 7/024; H04L 47/125; H04L 47/83
See application file for complete search history.

(56) References Cited

U.S. PATENT DOCUMENTS

| | | |
|---|---|---|
| 2017/0238163 A1 | 8/2017 | Chen |
| 2018/0184412 A1 | 6/2018 | Youtz et al. |
| 2018/0227856 A1* | 8/2018 | Yang ................. H04W 52/0274 |
| 2019/0245611 A1* | 8/2019 | Peponides .......... H04B 7/18513 |
| 2021/0019619 A1* | 1/2021 | Bhattacharyya ..... G06N 3/0455 |
| 2021/0185066 A1* | 6/2021 | Shah ........................ G06N 3/08 |

FOREIGN PATENT DOCUMENTS

| | | |
|---|---|---|
| CN | 106448151 B | 12/2019 |
| WO | 2017091115 A1 | 6/2017 |

OTHER PUBLICATIONS

Zhang et al. "Deep Learning in Mobile and Wireless Netwroking: A Survey"; IEEE Communications Surveys & Tutorials; Mar. 2018, consisting of 43 pages.
International Search Report and Written Opinion dated Mar. 5, 2021 for International Application No. PCT/SE2020/050408 filed Apr. 22, 2020, consisting of 9 pages.

* cited by examiner

MANAGING A NODE IN A COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2020/050408, filed Apr. 22, 2020 entitled "MANAGING A NODE IN A COMMUNICATION NETWORK," the entirety of which is incorporated herein by reference.

TECHNICAL FIELD

The present disclosure relates to a method for managing a first node in a communication network, and to a method for facilitating management of a first node in a communication network. The present disclosure also relates to a node for managing a first node in a communication network, a node for facilitating management of a first node in a communication network and to a computer program product configured, when run on a computer to carry out methods for managing a first node and for facilitating management of a first node.

BACKGROUND

There exists a wide range of techniques aimed at increasing the efficiency and improving operation of Radio Access Networks. Load Balancing, Carrier Aggregation and Dual Connectivity are three examples of such techniques, and a brief discussion of these examples, together with an introduction to challenges faced in their implementation, is provided below.

Load Balancing

In order to increase capacity in a cellular communication network, the network operator may deploy cells on multiple frequency layers, referred to as carriers, as illustrated in FIG. 1. FIG. 1 shows two radio access nodes 102, 104, which may be eNBs, gNBs etc., and four overlaid cells 106a, 106b, 108, 110 deployed on the radio access nodes. Load balancing is a technique to balance the traffic load between overlaid cells in the network in order to most efficiently use the capacity on the different frequency layers. Potential load balancing opportunities in FIG. 1 are indicated by arrows between overlaid cells. Each radio access node assesses the traffic load in its cells and this information is exchanged between the cells. A load balancing algorithm may then identify whether there is a need to move users between the cells in order to balance the traffic load. If there is a need to move users in order to balance the traffic load, users are selected and ordered to perform inter-frequency measurements in order to be moved in some way (handover, release with redirect, etc.). The traffic load information shared by radio access nodes could comprise a number of connected users, number of active users, share of used Physical Resource Blocks (PRBs), mean traffic volume over time, etc.

One significant challenge in load balancing is to select users to move from one cell (the source cell) that is highly loaded to another cell (the target cell) that is under used. Each load balancing inter-frequency measurement performed by a UE that is not a good candidate for cell transfer is a waste of resources including signalling, processing, UE battery consumption and user performance. The cost associated with identifying good candidates is two-fold: many UEs will expend resources for load balancing measurements unnecessarily, and a crowded cell will stay in a high-load situation longer than necessary while suitable candidates are identified.

Carrier Aggregation and Dual Connectivity

User devices may be configured to transmit and/or receive data via more than one frequency layer/carrier from the same radio access node. This is referred to as carrier aggregation. When multiple carriers are available, it is possible to deploy several cells on different carriers. The cells may have a similar coverage area, as illustrated in FIG. 2, or a different coverage area, as illustrated by FIG. 1. Each carrier is referred to as a Component Carrier (CC). In Carrier Aggregation (CA), two or more such Component Carriers (CCs) are aggregated in order to support wider transmission bandwidths. A device may simultaneously receive or transmit on one or multiple CCs depending on its capabilities. A 3GPP Rel-10 device with reception and/or transmission capabilities for CA can simultaneously receive and/or transmit on multiple CCs corresponding to multiple serving cells. CA is specified for both contiguous and non-contiguous CCs. It is possible to configure a device to aggregate a different number of CCs originating from the same eNB and of possibly different bandwidths in the UL and the DL. The number of DL CCs that can be configured depends on the DL aggregation capability of the device and the network. The number of UL CCs that can be configured depends on the UL aggregation capability of the device and the network. CCs originating from the same eNB need not to provide the same coverage.

The concept of Dual Connectivity (DC) is introduced in 3GPP in Rel. 12. DC enables the establishment of user plane connections via another radio node, referred to as a Secondary eNB (SeNB), while maintaining the higher layer connection management (RRC) via a Master eNB (MeNB). This means that a device may have user plane connections completely via the MeNB, completely via the SeNB, or split between both MeNB and SeNB.

Generalizing dual connectivity, it is possible to consider connections to more than one SeNB, and also where the SeNB supports a different radio access technology, such as WFi, 5G, 3G, 2G, etc. Unlicensed carrier operation is different from licensed carrier operation in that there are some co-existence criteria that have to be met in order to co-exist with other connections in the same band. This is discussed in 3GPP as Licensed Assisted Access (LAA), which essentially is a Primary Cell (PCell) operating on a licensed carrier and a Secondary Cell (SCell) operating on an unlicensed carrier, where the SCell then also has to meet the co-existence criteria.

In order to use the increased capacity afforded by network techniques such as dual connectivity and carrier aggregation, support for such techniques could be activated for each user device or UE on connection setup. However, the setup for such procedures is associated with a cost in terms of signalling and measurement overhead that drains UE battery. The cost of setup is a reasonable trade-off for the advantages afforded when applied to UEs with heavy data transmissions such as video streaming, and large file downloads. However, if a UE has only a small packet reception such as an HTTP packet of the order of tens of Kbs, it may be preferable to save the resources that would be used in setting CA or DC, and receive the serving packet on the primary carrier.

One technique for identifying UEs for which the setup of CA or DC will be worthwhile is to observe the UE traffic for some seconds before activating CA or DC. However, this results in less than optimal throughput performance, which is an important performance indicator for network operators. Another technique could be to store the historical information relating to each UE transmission in order to predict likely traffic when the UE reconnects, although this implies significant data storage overhead and may raise privacy concerns for users.

Another challenge in making full use of the advantage soffered by CA and DC is associated with the evolution of communication networks to Fifth Generation (5G) networks. 5G targets applications other than smartphones, such as connected vehicles and IoT. The traffic pattern in 5G networks will therefore be highly UE-specific, meaning that one configuration in CA, or DC will not be adequate for all types of device. Also, communication among intelligent machines is a new type of communication foreseen for future 5G/6G, with a new type of traffic pattern.

SUMMARY

It is an aim of the present disclosure to provide nodes, methods and a computer readable medium which at least partially address one or more of the challenges discussed above. It is a further aim of the present disclosure to provide nodes, methods and a computer readable medium which cooperate to facilitate using a Variational Autoencoder to generate a predicted traffic distribution for a node, which predicted traffic distribution may be used as a basis for configuring one or more radio resource parameters for the node.

According to a first aspect of the present disclosure, there is provided a method for managing a first node in a communication network, wherein the first node is operable to exchange traffic flows with other nodes in the communication network. The method comprises using a Variational Autoencoder (VAE) to generate a predicted traffic distribution for the first node, wherein the VAE has been trained using information about historical data flows exchanged by the first node with at least one other node in the communication network. The method further comprises configuring at least one radio resource parameter of the first node based on the obtained predicted traffic distribution for the first node.

According to another aspect of the present disclosure, there is provided a method for facilitating management of a first node in a communication network, wherein the first node is operable to exchange traffic flows with other nodes in the communication network. The method comprises obtaining information about historical data flows exchanged by the first node with at least one other node in the communication network, and using the obtained information to train a VAE to generate a predicted traffic distribution for the first node.

According to another aspect of the present disclosure, there is provided a computer program product comprising a computer readable medium, the computer readable medium having computer readable code embodied therein, the computer readable code being configured such that, on execution by a suitable computer or processor, the computer or processor is caused to perform a method according to any one or more of the aspects or examples of the present disclosure.

According to another aspect of the present disclosure, there is provided a node for managing a first node in a communication network, wherein the first node is operable to exchange traffic flows with other nodes in the communication network. The node comprises processing circuitry configured to cause the node to use a VAE to generate a predicted traffic distribution for the first node, wherein the VAE has been trained using information about historical data flows exchanged by the first node with at least one other node in the communication network. The processing circuitry is further configured to cause the node to configure at least one radio resource parameter of the first node based on the obtained predicted traffic distribution for the first node.

According to another aspect of the present disclosure, there is provided a node for facilitating management of a first node in a communication network, wherein the first node is operable to exchange traffic flows with other nodes in the communication network. The node comprises processing circuitry configured to cause the node to obtain information about historical data flows exchanged by the first node with at least one other node in the communication network, and use the obtained information to train a VAE to generate a predicted traffic distribution for the first node.

Aspects of the present disclosure provide methods that facilitate the management of a communication network node such as a wireless device or a base station. Examples of the methods disclosed herein enable the training and use of a Variational Autoencoder (VAE) for generating an expected traffic pattern or patterns of a node in a communication network. The node may for example be a wireless device such as a UE, or may be a radio access node such as a base station. The VAE may be trained using historical sessions of a wireless device or multiple wireless devices served by a radio access node, and may be trained at the wireless device, radio access node or in some other node of the communication network, for example in a core network node.

The methods disclosed herein envisage configuring at least one radio resource parameter for a node based on a predicted traffic distribution for the node generated by a VAE. The radio resource parameter may relate to the activation of Carrier Aggregation, Dual Connectivity, measurements for load balancing, beamforming, etc. Examples of the method disclosed herein thus envisage using a predicted traffic distribution generated by a VAE to inform decisions regarding management of the node which may enhance performance of the communication network. In the case of a wireless device, signalling is disclosed that may enable a node carrying out methods according to the present disclosure to generate a predicted traffic distribution for the wireless device at connection setup for the device, i.e. before the device has started sending or receiving traffic via the network, so avoiding the need for an observation period before configuring certain radio resource parameters.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Example methods according to the present disclosure encompass both training of a VAE, on the basis of information about historical data flows exchanged by the wireless device or radio access node with other node or nodes in the communication network, and use of a VAE to generate predicted traffic patterns. In some examples, such as when the VAE is trained by a wireless device, the wireless device may signal the latent space distribution, or z-distribution, and decoder of its VAE to its serving radio access node when it connects to the communication network. The radio access node, or another node, may then sample from the z-distribution information and input the samples (z) into the decoder to generate a predicted traffic distribution for the device. On the basis of this predicted traffic distribution, one or more radio resource parameters for the wireless device may be configured.

In order to provide additional context for the present disclosure, there now follows a brief discussion of Variational Autoencoders.

Variational Autoencoders represent a particular class of Autoencoders. An autoencoder is a type of machine learning algorithm that may be used to concentrate data. Autoencoders are trained to take a set of input features and reduce the dimensionality of the input features, with minimal information loss. Training of an autoencoder is generally an unsupervised process, with the autoencoder divided into two parts: an encoding part or encoder and a decoding part or decoder. The encoder and decoder may comprise, for example, deep neural networks comprising layers of neurons. An encoder successfully encodes or compresses the data if the decoder is able to restore the original data stream with a tolerable loss of data. Training may comprise reducing a loss function describing the difference between the input (raw) and output (decoded) data. Training the encoder part thus involves optimising the data loss of the encoder process. An autoencoder may be considered to concentrate the data (for example as opposed to merely reducing the dimensionality) because essential or prominent features in the data are not lost.

Figure 1:
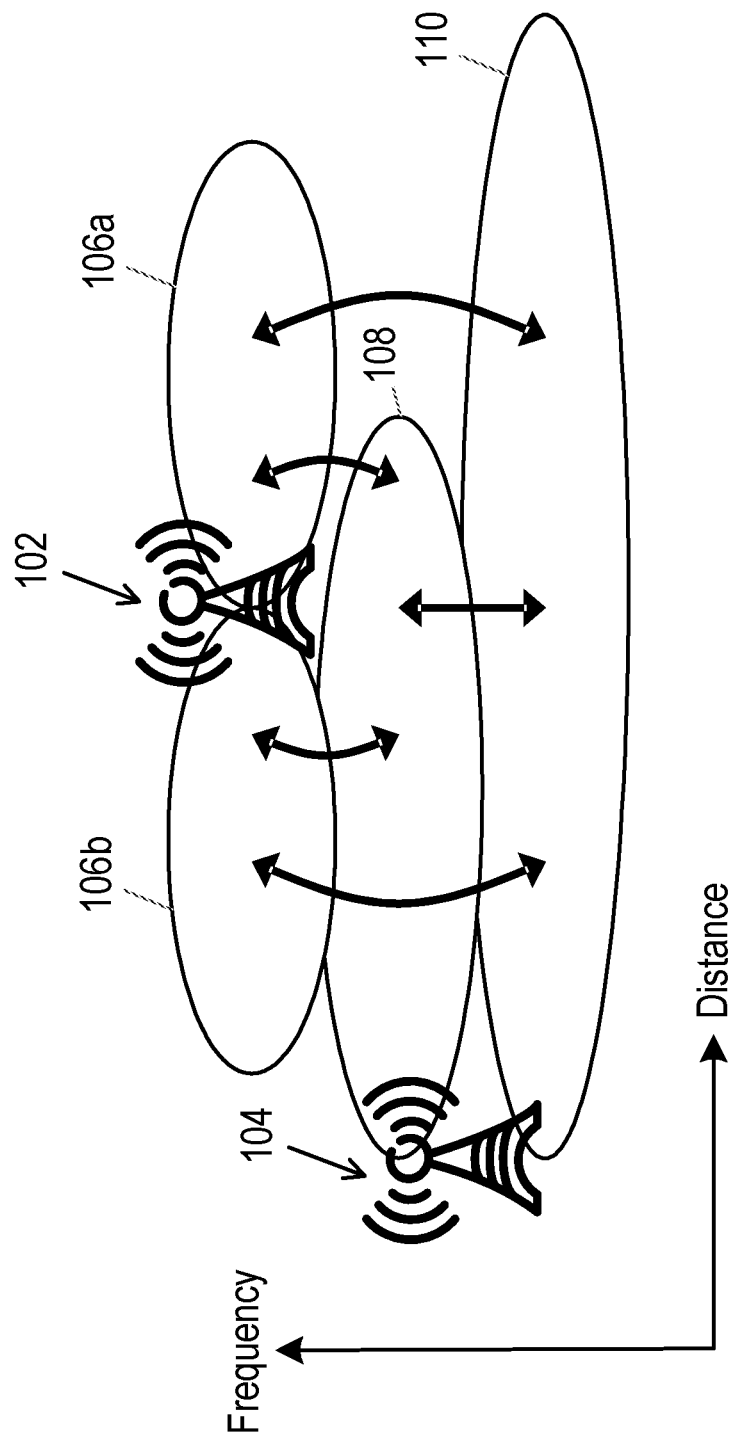
FIG. 1 illustrates load balancing in a communication network.
Figure 2:
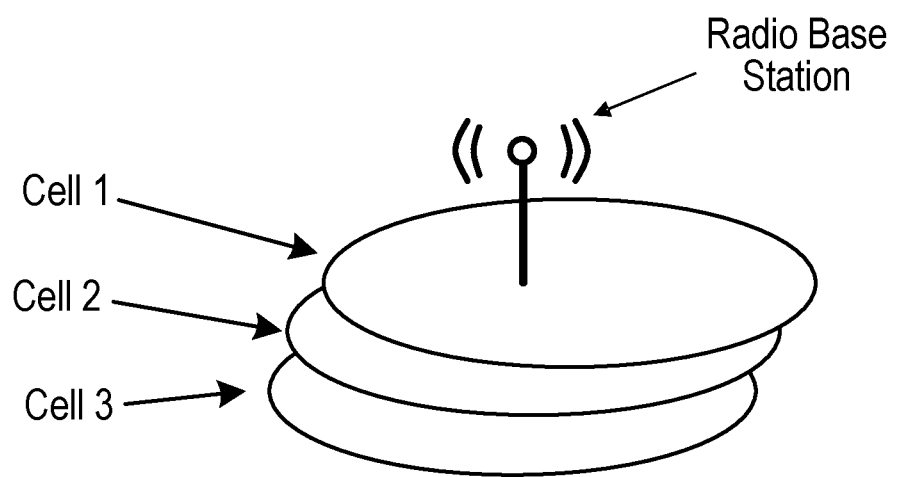
FIG. 2 illustrates carrier aggregation in a communication network.
Figure 3:
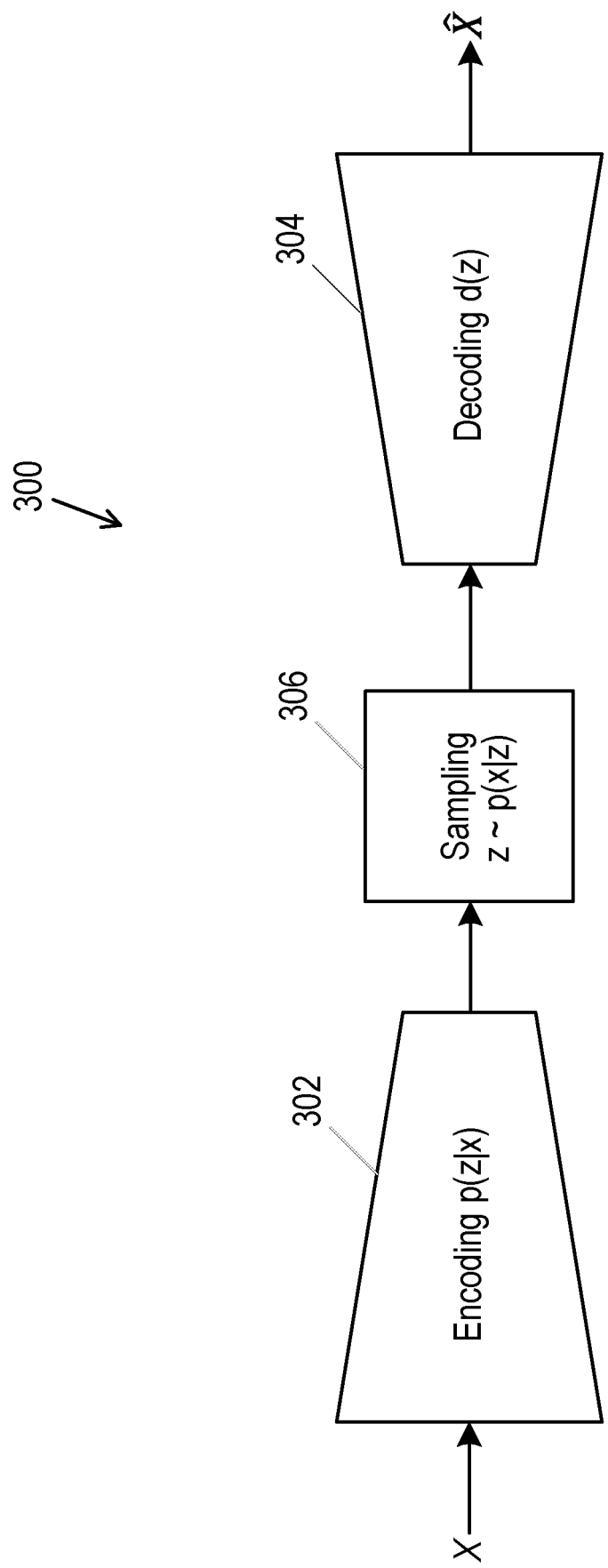
FIG. 3 illustrates a Variational Autoencoder.

A Variational autoencoder (VAE) is an autoencoder for which the encoded distribution is regularized during training, so as to avoid overfitting to the raw input data used in training. This regularisation ensures that the latent space (the encoded distribution) has properties that facilitate the generation of new samples from the data distribution. A structural overview of a VAE 300 is provided in FIG. 3. The VAE comprises an encoder 302 and a decoder 304. In contrast to a conventional autoencoder, which encodes an input as a single point, a VAE encodes an input as a distribution over the latent space 306. During training, a point from the latent space may then be sampled from the encoded distribution in order to be decoded and allowing for reconstruction error to be computed and backpropagated through the network. The loss function that is minimised when training a VAE, such as the VAE 300, comprises a reconstruction term, which is based on the final layer of the VAE and prioritises performance of the encoding-decoding scheme, and a regularisation term, which is based on the latent space and seeks to regularise the organisation of the latent space, so prioritising the performance of the VAE for generation of new data samples.

FIGS. 4 to 7b are flow charts illustrating methods for management of a first node and for facilitating management of a first node according to examples of the present disclosure. The methods may cooperate to achieve configuration of radio resource parameters on the basis of a predicted traffic distribution for the first node, so allowing for such configuration before traffic from the first node has been observed.

Figure 4:
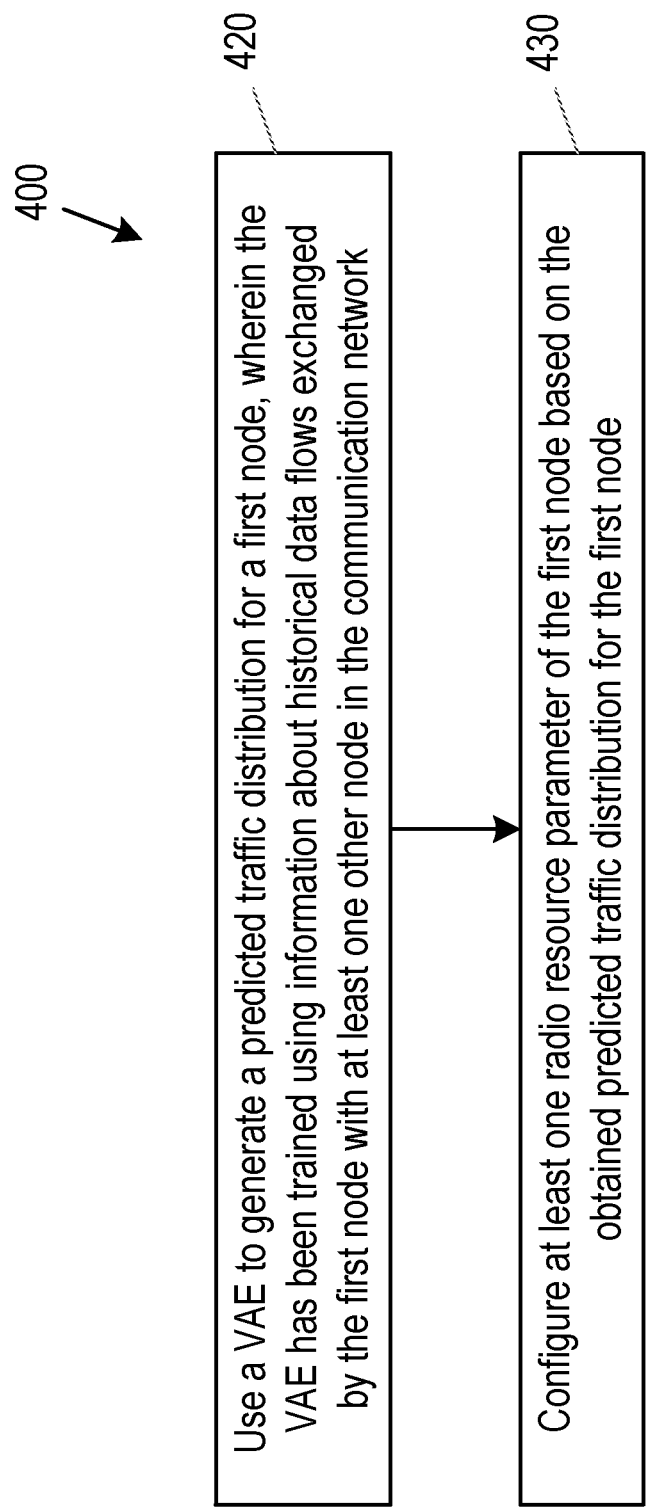
FIG. 4 is a flow chart illustrating process steps in a method for managing a first node in a communication network.

FIG. 4 is a flow chart illustrating process steps in a method 400 for managing a first node in a communication network, wherein the first node is operable to exchange traffic flows with other nodes in the communication network. The first node may be a wireless device or may be a radio access node. Referring to FIG. 4, the method comprises, in a first step 420, using a VAE to generate a predicted traffic distribution for the first node, wherein the VAE has been trained using information about historical data flows exchanged by the first node with at least one other node in the communication network. The method further comprises, at step 430, configuring at least one radio resource parameter of the first node based on the obtained predicted traffic distribution for the first node.

Figure 5:
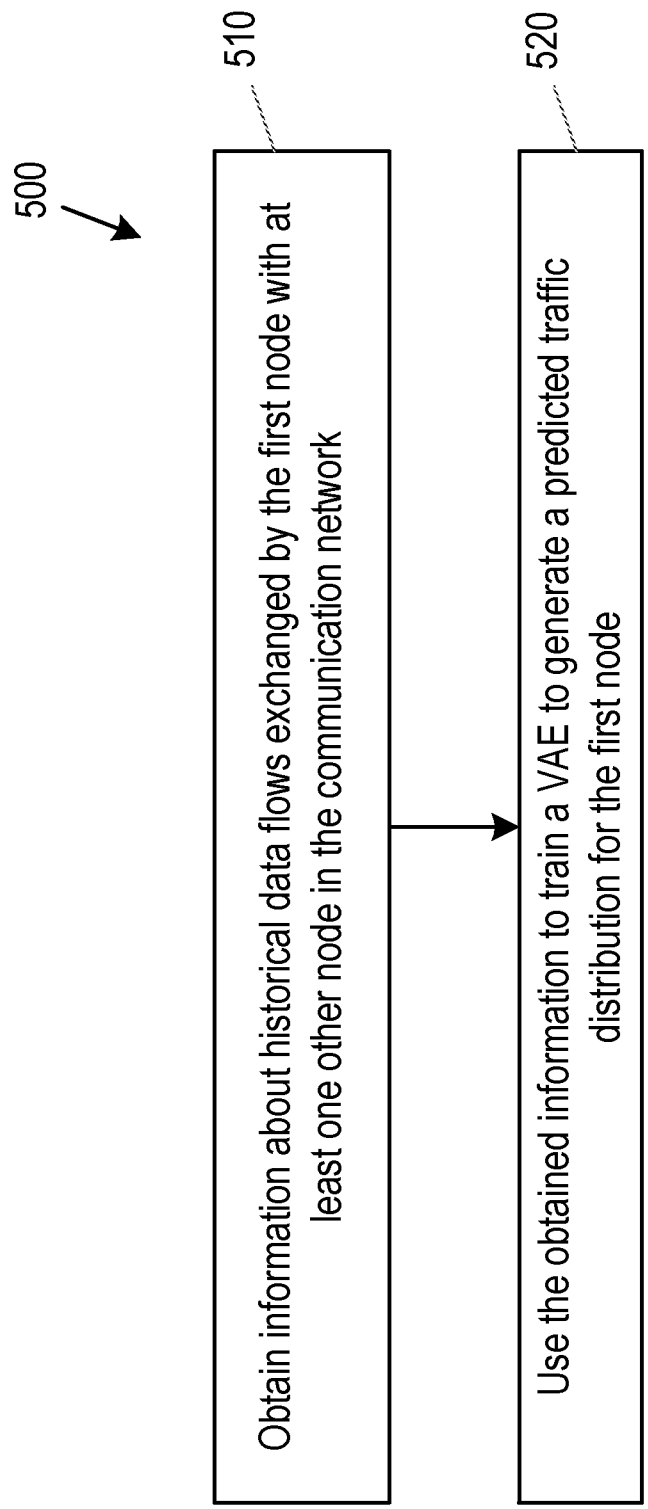
FIG. 5 is a flow chart illustrating process steps in a method for facilitating management of first node in a communication network.

The method 400 may be complimented by a method 500 for facilitating management of a first node in a communication network, wherein the first node is operable to exchange traffic flows with other nodes in the communication network. The first node may be a wireless device or may be a radio access node. FIG. 5 is a flow chart illustrating process steps in such a method 500. Referring to FIG. 5, in a first step 510, the method 500 comprises obtaining information about historical data flows exchanged by the first node with at least one other node in the communication network. The method 400 further comprises, in step 520, using the obtained information to train a VAE to generate a predicted traffic distribution for the first node.

Figure 6A:
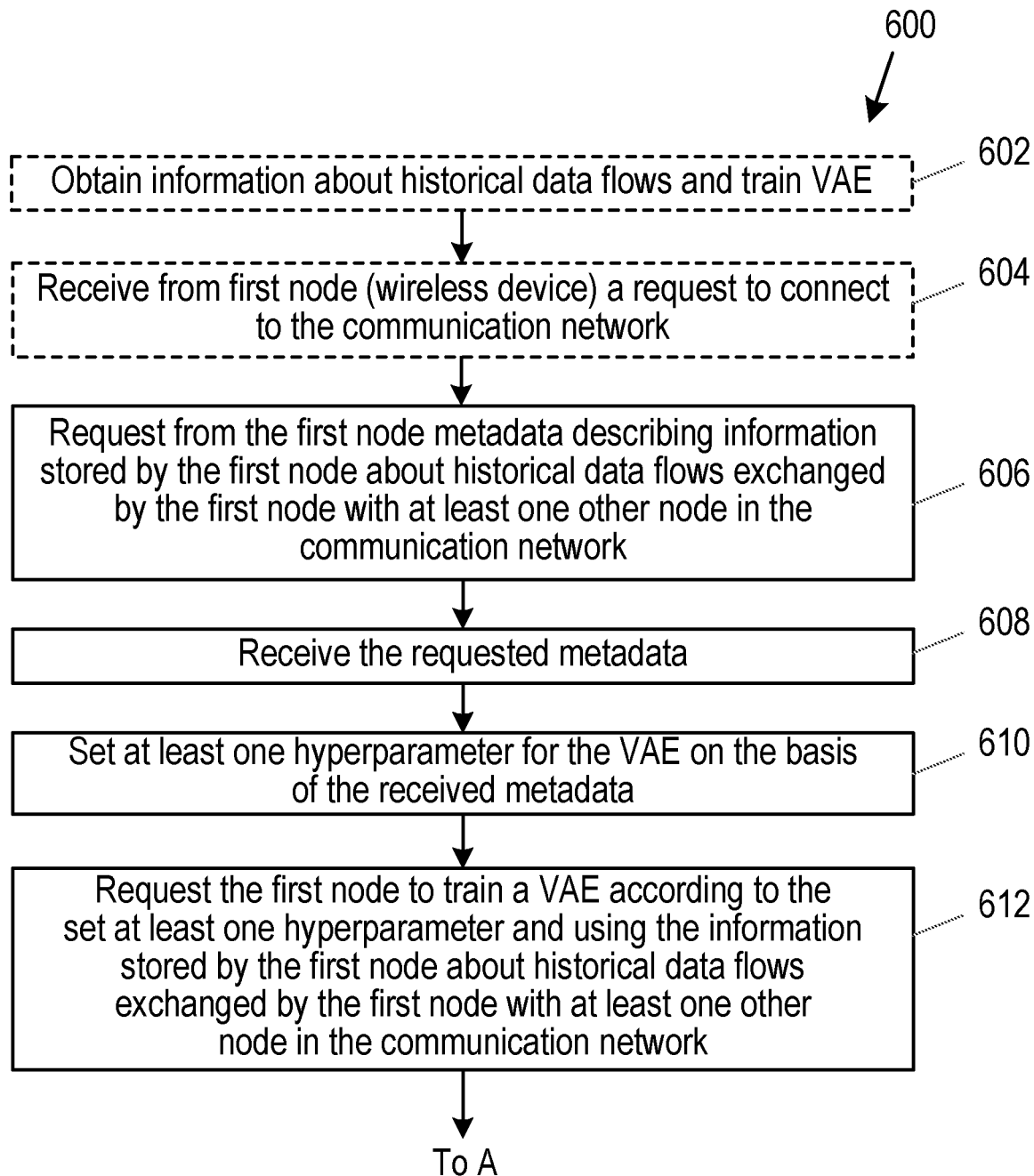
FIG. 6 is a flow chart illustrating process steps in another example of method for managing a first node in a communication network.
Figure 6B:
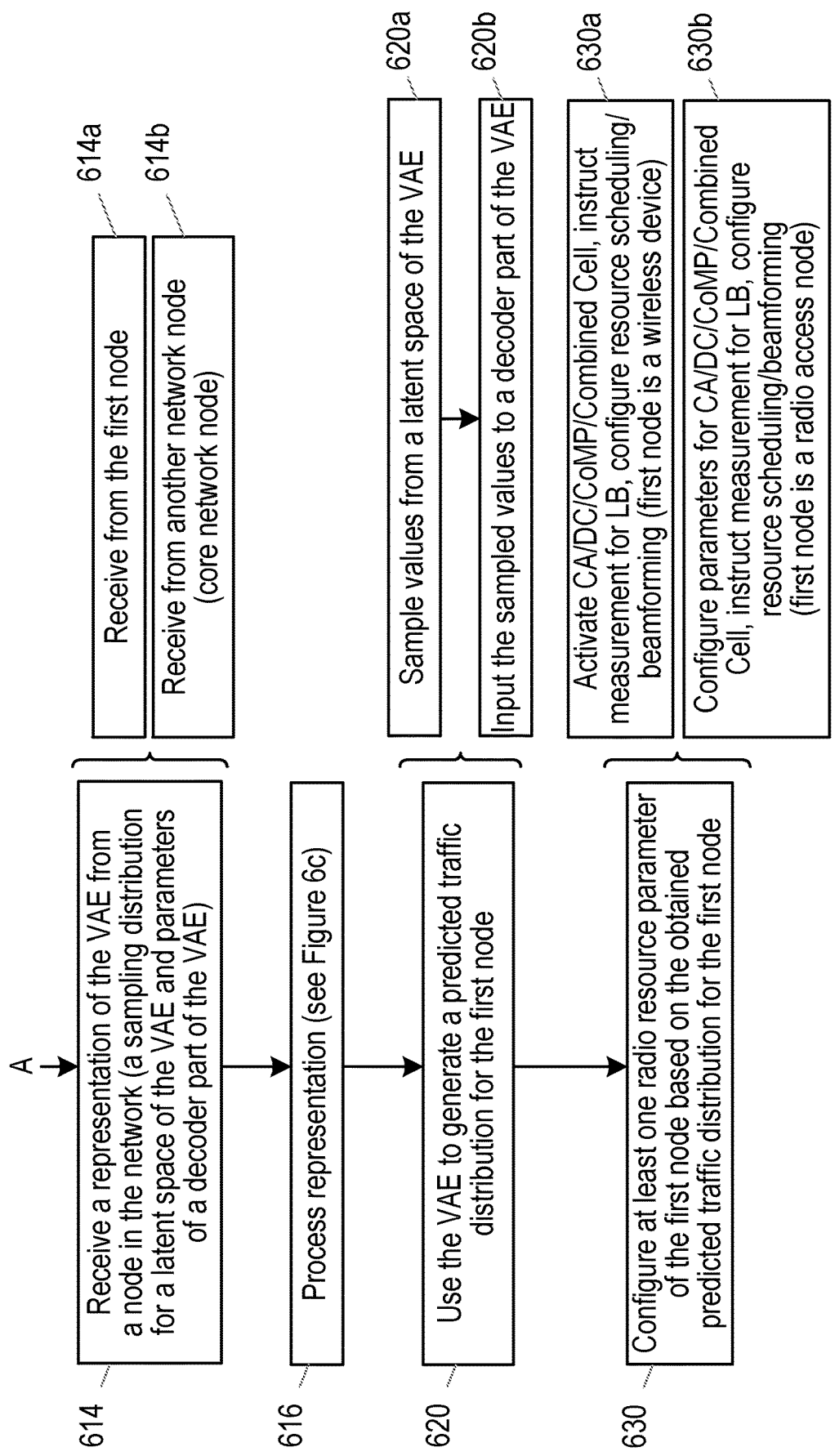
Figure 6C:
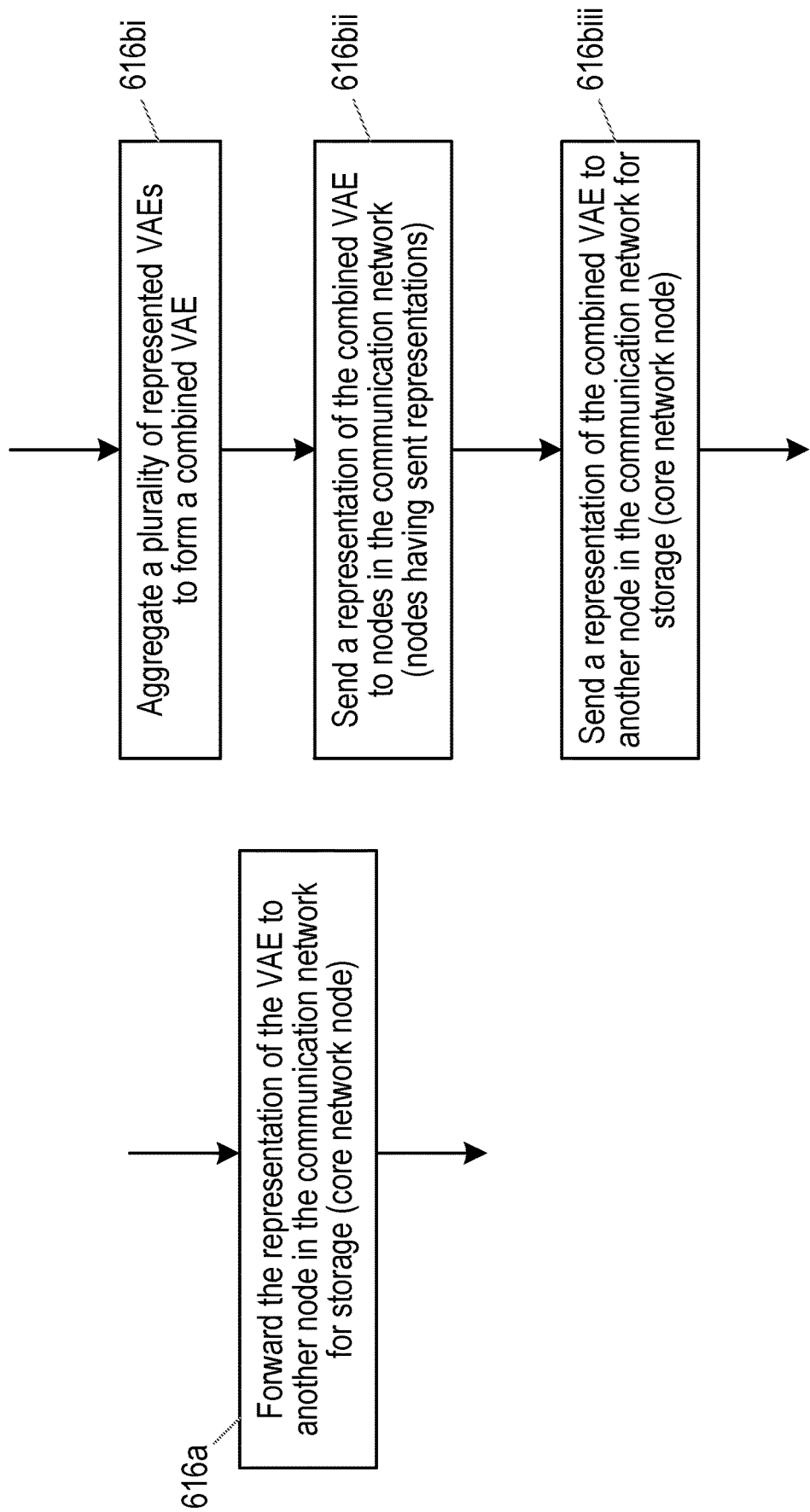

FIGS. 6a to 6c show a flow chart illustrating process steps in another example of method 600 for managing a first node in a communication network, wherein the first node is operable to exchange traffic flows with other nodes in the communication network. The method 600 provides various examples of how the steps of the method 400 may be implemented and supplemented to achieve the above discussed and additional functionality. The first node may be a wireless device or may be a radio access node. The method 600 may be performed by a radio access node, a core network node, or any other node in the communication network. In the following discussion of FIGS. 6a to 6c, examples are considered in which the first node is a wireless device and the method is performed by a radio access node, and in which the first node is a radio access node and the method is performed by a core network node.

As noted above, the method 600 is for managing a first node in a communication network. The method, as discussed in further detail below, involves the step of using a VAE to generate a predicted traffic distribution for the first node. In some examples, as illustrated at step 602 of FIG. 6a, the node performing the method 600 may also train the VAE. This may be the case for example if the first node is a radio access node such as a base station, and the method 600 is carried out by a core network node. Such a core network node may both train a VAE using historical data obtained from the radio access node, and use the VAE to generate a predicted traffic distribution for the radio access node, on the basis of which the core network node may configure one or more radio resource parameters for the radio access node. As discussed in greater detail below with reference to FIGS. 7a and 7b, training the VAE at step 602 may comprise obtaining information about historical data flows exchanged by the first node with at least one other node in the communication network, setting at least one hyperparameter for the VAE on the basis of the obtained information, and training the VAE using the obtained information and according to the set at least one hyperparameter.

In other examples of the method 600, the training of the VAE may be performed by a different node to that carrying out the method 600, such as the first node or another node in the communication network. This may be the case for example if the first node is a wireless device, and the method 600 is carried out by a radio access node such as the serving base station for the wireless device. Steps 606 to 614 of the method 600 illustrate examples in which the VAE is trained by a node other than the node performing the method 600.

In examples in which the first node is a wireless device such as a UE, the method 600 may comprise, in step 604, receiving from the wireless device a request to connect to the communication network. The received connection request may trigger the performance of the method 600 with respect to the wireless device from which the connection request was received.

In step 606, the method 600 may comprise requesting from the first node metadata describing information stored by the first node about historical data flows exchanged by the first node with at least one other node in the communication network. The metadata may describe features of the dataset for historical traffic flows that are available for training the VAE, such as Packet Inter Arrival Time (standard deviation, average, etc.), Number of Packets (Up/Down), Total bytes (Up/Down), Packet sizes (standard deviation, average, etc.), Packet protocols (http/voice, etc.) and/or any other features of the dataset available to the first node. In step 608, the method 600 may comprise receiving the requested metadata.

In step 610 the method may comprise setting at least one hyperparameter for the VAE on the basis of the received metadata. It will be appreciated that a hyperparameter of a model such as a VAE is a parameter that is external to the model, and whose value cannot be estimated from data processed by the model but nonetheless shapes how the model learns its internal parameters. Model hyperparameters may be tuned for a given problem or use case. Examples of hyperparameters for a neural network based VAE may include a time interval for data processing, a scaling factor, and/or a layer number decreasing rate. According to the present disclosure, the at least one hyperparameter for the VAE may additionally or alternatively indicate the features that should be generated by the VAE, the weight of different features, so determining how well each feature distribution should be generated, a tradeoff between reconstruction performance and signaling overhead for transmitting the latent space and decoder of the VAE, and/or a size of the VAE model (number of layers, activation functions, floating point representation etc.). Other hyperparameters may be envisaged. The setting of at least one hyperparameter for the VAE may also be based on a radio resource parameter that is to be configured for the first node on the basis of a traffic distribution to be predicted by the VAE. Thus, the features of the traffic distribution that are most relevant for the setting of particular radio resource parameters to be configured may be prioritised in the hyperparameters set at step 610.

In step 612, the method 600 may comprise requesting the first node to train a VAE according to the set at least one hyperparameter and using the information stored by the first node about historical data flows exchanged by the first node with at least one other node in the communication network.

Referring now to FIG. 6b, the method 600 comprises, in step 614, receiving a representation of the VAE from a node in the network, wherein the representation comprises a sampling distribution for a latent space of the VAE, and parameters of a decoder part of the VAE. The parameters of the decoder part may include a number of layers in the decoder part, a number of neurons in each layer, and/or weights for connections between the neurons of the decoder part.

As illustrated at 614a and 614b, the representation of the VAE may be received from at least one of the first node or another node in the network. In examples of the method 600 in which steps 606 to 612 re carried out, the representation of the VAE may be received from the first node in accordance with the request sent to the first node to train the VAE, the first node being either a wireless device of a radio access node. In other examples, the representation of the VAE may be received from a core network node. The core network node may be the node that trained the VAE, or may simply store the representation, with the VAE having been trained by a different node (such as the first node). Thus in some examples, and as discussed in further detail below, the method 600 may comprise, in an initial execution of the method 600, receiving a representation of the VAE from the first node and sending the representation to a core network node for storage. In a subsequent execution of the method 600, the method 600 may comprise retrieving the stored representation from the core network node.

In step 616, the method 600 comprises processing the received representation. Examples of the processing step 616 are illustrated in FIG. 6c. Referring now to FIG. 6c, two examples of processing a received representation of a VAE are illustrated. In step 616a, the processing step may comprise forwarding the representation of the VAE to another node in the communication network for storage. This may for example be a core network node, which may have greater storage capacity than the node carrying out the method 600. In another example, illustrated on the right of FIG. 6c, the step 614 of receiving a representation of the VAE may have comprised receiving a plurality of representations of VAEs from a plurality of nodes in the network, wherein each VAE has been trained by the node from which its representation was received using information about historical data flows exchanged by the node with at least one other node in the communication network. In such examples, the processing step 616 may comprise, at step 616bi, aggregating the represented VAEs to form a combined VAE, and, at step 616bii, sending a representation of the combined VAE to nodes in the communication network, which may include all nodes having sent a representation. In step 616biii, the representation of the combined VAE may also be sent to another node in the communication network for storage. The example 616b may therefore allow for training of individual VAEs at a plurality of first nodes, such as a plurality of wireless devices. Each VAE may be trained by a respective wireless device using its own historical traffic flow data. These VAEs may then be aggregated by the node performing the method 600, in order to avoid overfitting by individual UEs to their traffic flows, and so generate a combined VAE that is tailored to the group of contributing wireless devices. This combined VAE may then be used for the generation of predicted traffic distributions for all of the wireless devices that contributed representations of individual VAEs.

Referring again to FIG. 6b, in step 620, the method 600 comprises using the VAE to generate a predicted traffic distribution for the first node, the VAE having been trained using information about historical data flows exchanged by the first node with at least one other node in the communication network, as discussed above. As illustrated in FIG. 6b, using the VAE may comprise, in step 620a, sampling values from a latent space of the VAE, and, in step 620b, inputting the sampled values to a decoder part of the VAE.

In step 630, the method 600 comprises configuring at least one radio resource parameter of the first node based on the generated predicted traffic distribution for the first node. The nature of the one or more radio resource parameters to be configured may depend upon whether the first node is a wireless device or a radio access node, and upon the particular use case for which the method is being executed.

As illustrated at step 630a, in examples in which the first node is a wireless device, configuring at least one radio resource parameter of the first node based on the predicted traffic distribution for the first node may comprise performing at least one of: activating carrier aggregation for the wireless device;
  activating dual connectivity for the wireless device;
  configuring at least one beamforming parameter for the wireless device;
  instructing the wireless device to perform a measurement for load balancing;
  activating Coordinated MultiPoint (CoMP) transmission for the wireless device;
  activating combined cell for the wireless device; and/or
  configuring a resource scheduling parameter for the wireless device.

By basing a decision to activate carrier aggregation, dual connectivity, CoMP transmission and/or combined cell for a wireless device on a predicted traffic distribution for the wireless device generated by a VAE, the node performing the method 600 may ensure that an appropriate activation decision for the wireless device is made, without having to wait for an observation period to obtain real time information about the device traffic distribution. The generated predicted traffic profile thus allows for early optimisation of radio resources within a communication network cell, without compromising device resources by inappropriately activating one or more features for the device.

Configuring at least one beamforming parameter for the wireless device may ensure that a beamformer that is suitable for the device traffic profile is rapidly established. For example, a wireless device with many short flows may benefit from quickly setting up a wide and robust beamformer. In contrast, a wireless device with larger flows may benefit from spending more resources in setting up more complex, narrow and pencil-shaped beams. Establishing an appropriate beamformer on connection of the wireless device can optimise both radio resources for the communication network and wireless device resources.

The challenges inherent in selecting suitable wireless devices for transfer as part of radio access network load balancing have been discussed earlier in the present disclosure. In configuring a device to perform load balancing measurements on the basis of a predicted traffic distribution for the device, these challenges may be addressed, identifying suitable wireless devices for transfer, and so avoiding the performance of load balancing measurements by wireless devices that are not good candidates, and identifying such devices without needing to wait for an observation period while a traffic distribution for the wireless device is observed.

In examples in which a resource scheduling parameter is configured for the wireless device, this may reflect one or more scheduling decisions for the wireless device that are or may be made on the basis of the predicted traffic distribution.

As illustrated at step 630b, in examples in which the first node is a radio access node, configuring at least one radio resource parameter of the first node based on the predicted traffic distribution for the first node may comprise performing at least one of:
  configuring a parameter for activation of at least one of carrier aggregation or dual connectivity for a wireless device connecting to the radio access node;
  configuring at least one beamforming parameter for a wireless device connecting to the radio access node;
  configuring a parameter for activation of Coordinated MultiPoint, CoMP, transmission for a wireless device connecting to the radio access node;
  configuring a parameter for activation of Combined Cell for a wireless device connecting to the radio access node; or
  configuring a resource scheduling parameter for a wireless device connecting to the radio access node.

As activation parameter for a wireless device may comprise a parameter activating one or more features for the wireless device or a parameter indicating whether the feature should be activated immediately on connection of the wireless device or at certain time after connection of the wireless device. The above parameters thus illustrate how features including carrier aggregation, dual connectivity etc. may be managed at the level of a radio access node, as opposed to at the level of a wireless device. Such management may be based on predicted traffic distribution for the radio access node.

The method 600 thus illustrates examples of how a VAE may be used to generate a predicted traffic distribution for a first node (such as a wireless device or a radio access node), and that predicted distribution may be used as a basis for configuring one or more radio resource parameters of the first node.

Figure 7A:
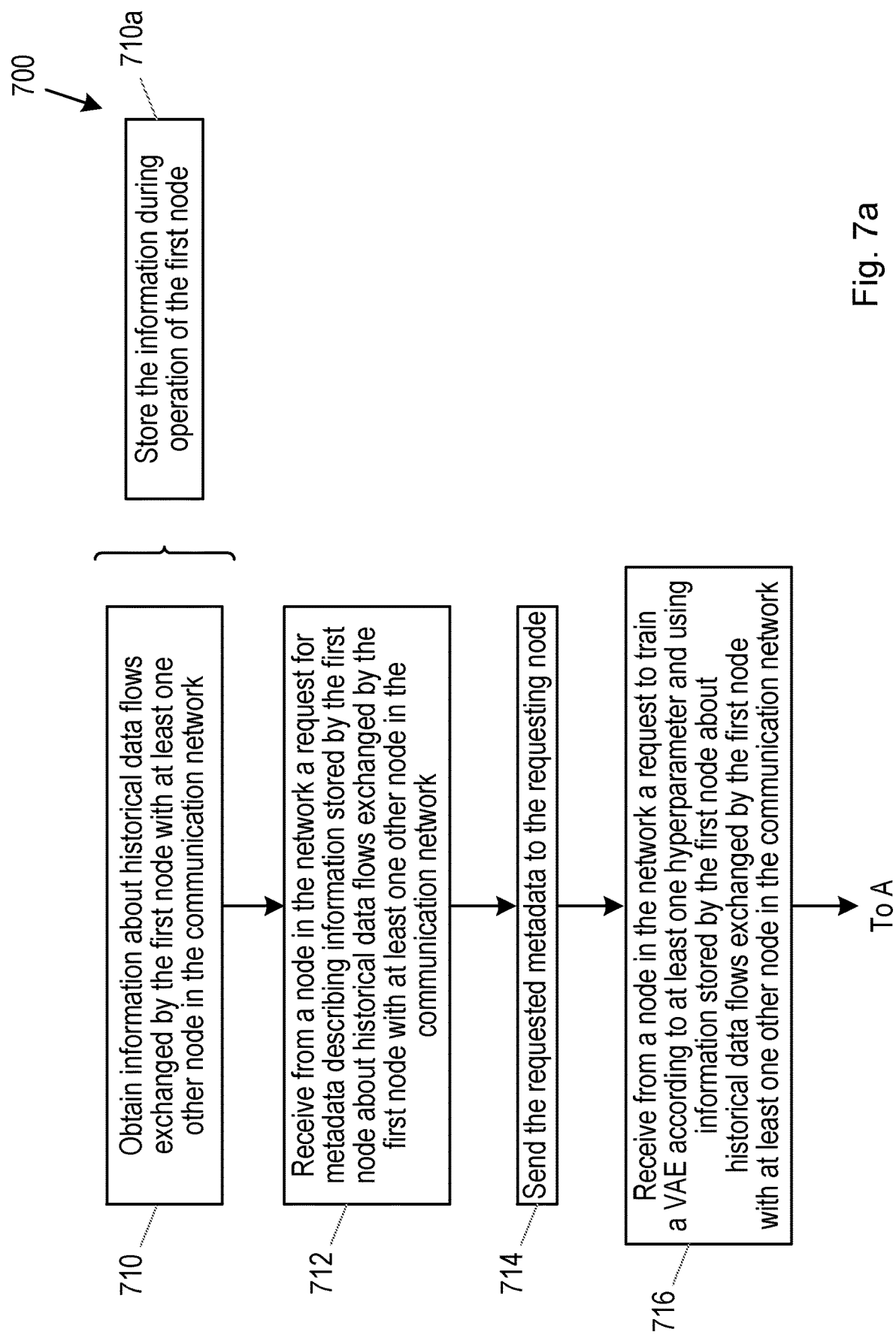
FIG. 7 is a flow chart illustrating process steps in another example of method for facilitating management of first node in a communication network.
Figure 7B:
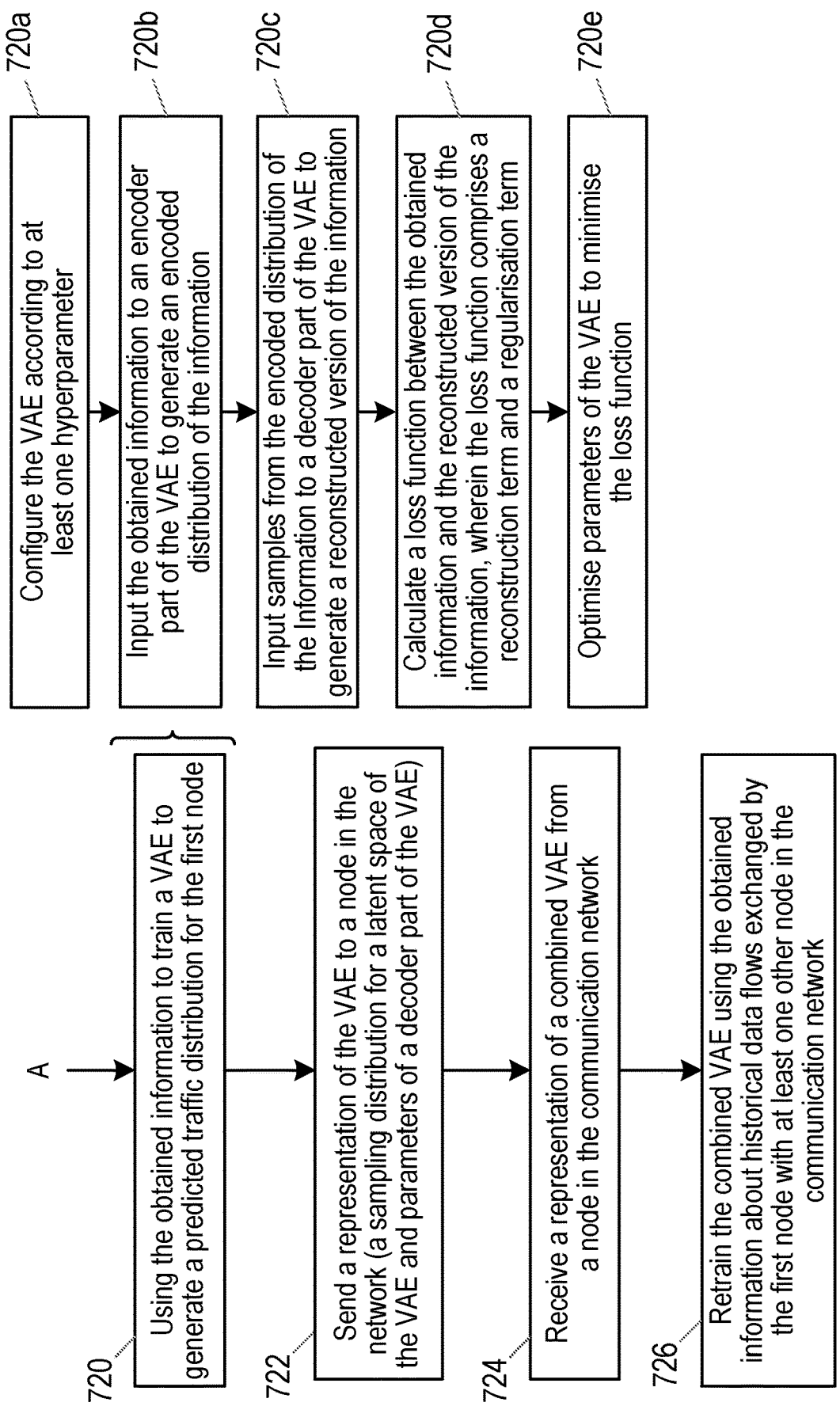

The method 600 may be complimented by a method 700, illustrated in FIGS. 7a and 7b, for facilitating management of a first node in a communication network, wherein the first node is operable to exchange traffic flows with other nodes in the communication network. The method 700 provides various examples of how the steps of the method 500 may be implemented and supplemented to achieve the above discussed and additional functionality. As for the method 600 above, the first node may be a wireless device or may be a radio access node. The method 700 may be performed by the first node, a core network node, or any other node in the communication network. In the following discussion of FIGS. 7a and 7b, examples are considered in which the first node is a wireless device, in which the first node is a radio access node, and in which the method 700 is performed by the wireless device or radio access node, or is performed by a core network node.

Referring initially to FIG. 7a, the method 700 comprises obtaining information about historical data flows exchanged by the first node with at least one other node in the communication network. In example in which the method 700 is performed by the first node, this may comprise, as illustrated at 710a, storing the information during operation of the first node. The information may include data for features of the historical traffic flows including Packet Inter Arrival Time (standard deviation, average, etc.), Number of Packets (Up/Down), Total bytes (Up/Down), Packet sizes (standard deviation, average, etc.), Packet protocols (http/voice, etc.).

In step 712, the method 700 comprises receiving, from a node in the network, a request for metadata describing information stored by the first node about historical data flows exchanged by the first node with at least one other node in the communication network. The node from which the request is received may be a radio access node, a core network node or any other network node. The metadata may include an identification of the above discussed features for which data is available. In step 714, the method comprises sending the requested metadata to the requesting node.

In step 716, the method comprises receiving from a node in the network a request to train a VAE according to at least one hyperparameter and using information stored by the first node about historical data flows exchanged by the first node with at least one other node in the communication network. The node from which the request of step 716 is received may be the same node from which the request in step 712 was received. The at least one hyperparameter for the VAE may indicate the features that should be generated by the VAE, the weight of different features, so determining how well each feature distribution should be generated, a tradeoff between reconstruction performance and signaling overhead for transmitting the latent space and decoder of the VAE, and/or a size of the VAE model (number of layers, activation functions, floating point representation etc.). Other hyperparameters may be envisaged.

Referring now to FIG. 7b, the method comprises, in step 720, using the obtained information to train VAE to generate a predicted traffic distribution for the first node. Step 720 may comprise first configuring the VAE according to at least one hyperparameter (which may be the at least one hyperparameter received in step 716) in step 720a, before inputting the obtained information to an encoder part of the VAE to generate an encoded distribution of the information in step 720b. Step 720 may further comprise inputting samples from the encoded distribution of the information to a decoder part of the VAE to generate a reconstructed version of the information in step 720c, and calculating a loss function between the obtained information and the reconstructed version of the information in step 720d, wherein the loss function comprises a reconstruction term and a regularisation term. Step 720 may further comprise optimising parameters of the VAE to minimise the loss function.

After training the VAE in step 720, the method 700 comprises, in step 722, sending a representation of the VAE to a node in the network, wherein the representation comprises a sampling distribution for a latent space of the VAE, and parameters of a decoder part of the VAE. The parameters of the decoder part may include a number of layers in the decoder part, a number of neurons in each layer, and weights for connections between the neurons of the decoder part. The node to which the representation is sent may be the node that requested training of the VAE, and may be a radio access node, a core network node or a wireless device.

As discussed above with reference to FIG. 6c, in some examples of the present disclosure, a node performing the method 600 may receive a plurality of representations of VAEs and may aggregate them to form a combined VAE. Steps 724 and 726 may be carried out at part of the method 700 according to such examples, as discussed below.

In step 724, the method 700 may comprise receiving a representation of a combined VAE from a node in the communication network. The node may be the node to which the representation as sent in step 722. In step 726, the method 700 may further comprise retraining the combined VAE using the obtained information about historical data flows exchanged by the first node with at least one other node in the communication network.

The method 700 thus illustrates examples of how a VAE for generating a predicted traffic distribution for a first node (such as a wireless device or a radio access node) may be trained.

It will be appreciated that some steps of the methods 600 and 700 may be performed in a different order to that in which they are presented above, and or may be combined, for example if the same node performs both training and use of the VAE. Thus the steps of obtaining information about historical data flows, setting hyperparameter(s), training a VAE based on the obtained information and in accordance with the set hyperparameters, using the trained VAE and configuring radio resource parameters, may all be performed by the same node. Although several of these steps are described above as being performed as part of one or other of the methods 600 or 700, they may be performed by a single node, as demonstrated by the inclusion of step 602 in some examples of the method 600.

Figure 8:
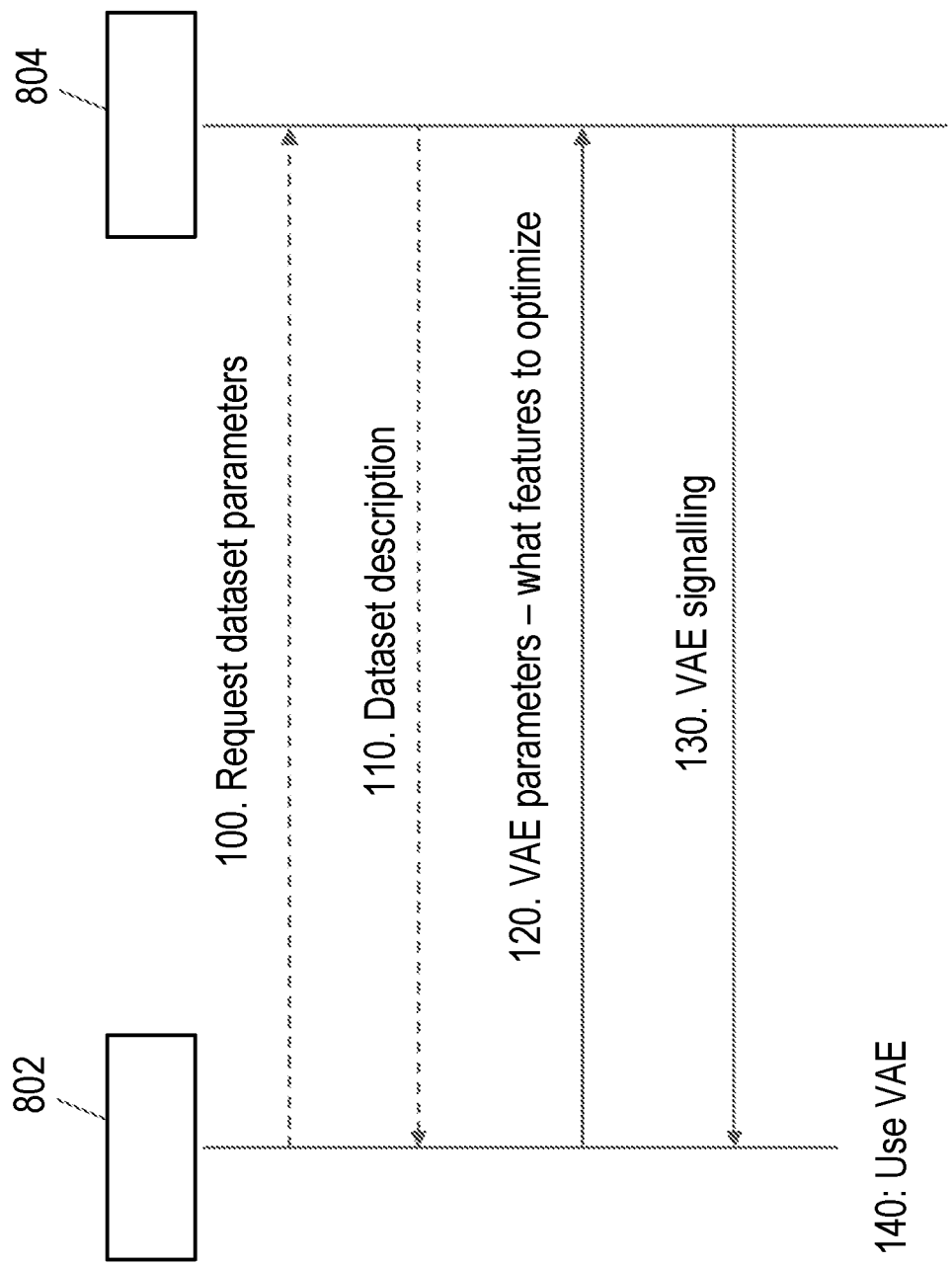
FIG. 8 illustrates an example signalling exchange that may take place during performance of methods according to the present disclosure.

FIG. 8 is a signalling diagram illustrating an example signalling exchange that may take place during performance of the methods 400, 500, 600 and/or 700. In the signalling diagram of FIG. 8, node 802 is a node carrying out the method 400 and/or 600, and may for example be a core node or a radio access node. Node 804 is a first node and may be a radio access node or a wireless device. In the example illustrated in FIG. 8, training of the VAE is performed by the first node 804.

Referring to FIG. 8, in message 100, the node 802 requests dataset parameters (metadata) available at the first node 804. The request may include an indication of which first node (which wireless device or radio access node) the request is targeting. In message 110, the first node 804 returns the requested metadata, describing features of the available dataset of information about historical data flows, for example the available logs for each traffic session. Based on the dataset description, in message 120, the node 802 send VAE hyperparameters, which may include a specification of what features should be generated by the VAE, the weight of each feature, indicating how well each feature distribution should be generated, reconstruction performance versus the signaling overhead tradeoff, and/or size of the VAE model (number of layers, activation functions, floating point representation etc.). Other hyperparameters may also be included. In message 130, the first node 804 signals the trained VAE (including the latent space distribution and the decoder) to the node 802. At 140, the node 802 uses the VAE as discussed above with reference to FIGS. 4 and 6b. As will be appreciated from the above discussion of the methods 600 and 700, what features of a traffic distribution are generated using the VAE, and what radio resource parameters are configured in the first node 804 as a consequence of the predicted traffic distribution, will depend upon a particular scenario (nature of the first node and node 802) and use case. Two example scenarios are discussed below for illustration, although it will be appreciated that a wide range of additional scenarios and use cases may also be envisaged, as discussed throughout the present disclosure.

Scenario 1: node 802 is a radio access node and the first node 804 contains traffic data from a UE:

The parameters to be generated by the VAE may be targeted to the use case. In the case of configuring a radio resource parameter for carrier aggregation, the VAE may be trained to generate flow length and traffic type. In an uplink synchronization use case, the VAE may be trained to generate packet inter-arrival rate. This information may be signalled in message 120 in order to train the traffic distribution, for example to set higher weights in the inter-arrival rate feature, meaning that its feature will be more accurately reconstructed.

Scenario 2: node 902 is a core node and the first node 804 contains traffic data from a radio access node:

The core node 802 uses the trained VAE to generate information regarding the traffic flow in the radio access node 804. If typically large flows are seen in radio access node 804, this may prompt adjustment of load balancing criteria, in addition to deployment of additional radio access nodes in the geographic location. If the typical packets are very small, then RRC timers for the radio access node may be adjusted accordingly.

FIGS. 4 to 7b and 8 described above illustrate methods for managing and facilitating the management of a first node in a communication network. There now follows a discussion of how aspects of these methods may be implemented in different entities.

Entities in which examples of the methods described above may be implemented include:

Radio access node: As used herein, a radio access node is part of the Radio Access Network (RAN) of a cellular communications network that operates to transmit and/or receive signals wirelessly. Some examples of a radio access node include, but are not limited to, a base station (for example, a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (for example, a micro base station, a pico base station, a home eNB, or the like), and a relay node. The expression "serving node" with reference to a wireless device refers to a radio access node handling the wireless connection between the network and the wireless device.

Core Node: As used herein, a core node is any type of node in a core network. Some examples of a core network node include, e.g., a Mobility Management Entity (MME), a Packet Data Network Gateway (P-GW), a Service Capability Exposure Function (SCEF), or the like. A core node may be a physical node or may be a virtualised network function.

Wireless device: As used herein, a wireless device is a UE or any other type of wireless device that has access to (i.e., is served by) a cellular communications network by wirelessly transmitting and/or receiving signals to a radio access node(s).

Figure 9:
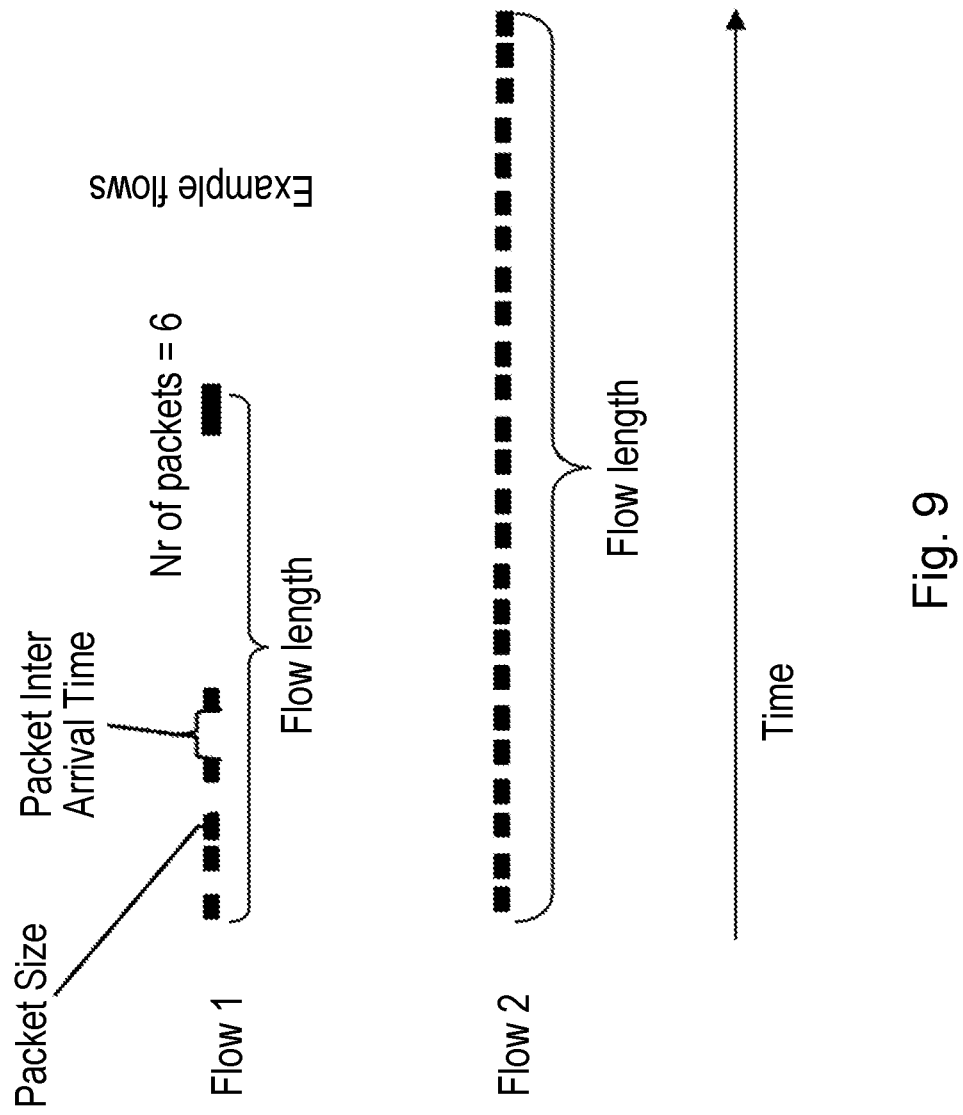
FIG. 9 illustrates an example of two wireless device traffic flows.

According to example of the present disclosure, a VAE is trained to predict a traffic distribution for a node such as a wireless device using information about historical data flows of the device. FIG. 9 illustrates an example of two wireless device traffic flows. Flow 1 is a short flow comprising a small number of packets. Flow 2 is a longer flow with more packets. Each of Flow 1 and Flow 2 may be described using a number of flow features that may be used to train the VAE. These features include:

Packet Inter Arrival Time (standard deviation, average, etc.)
Number of Packets (Up/Down)
Total bytes (Up/Down)
Packet sizes (standard deviation, average, etc.)
Packet protocols (http/voice, etc.)

Figure 10:
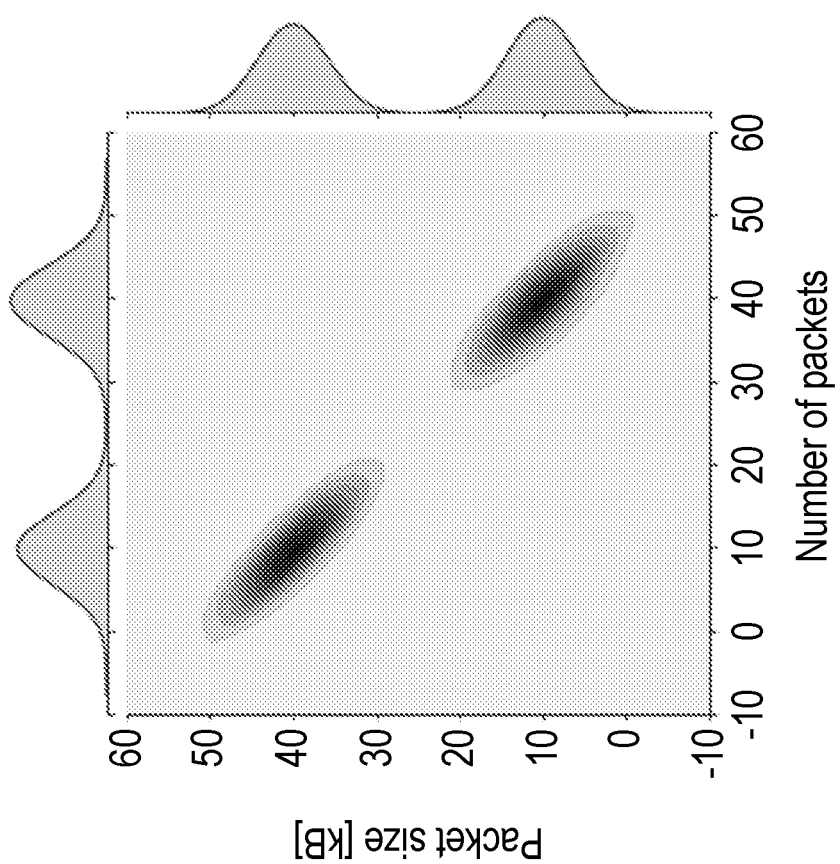
FIG. 10 illustrates distribution of stored historical flows X of a wireless device.

As discussed above, training of the VAE may be carried out at a core node or at the wireless device or radio access node. The VAE can be trained by first collecting a set of N traffic flows. For example, if it is assumed that a wireless device has collected recordings of N traffic flows (X), the resulting traffic flow distribution could be as illustrated in FIG. 10. FIG. 10 illustrates distribution of stored historical flows X of a wireless device, where the flow is described by number of packets and corresponding size only for simplicity and ease of representation. Dark colour indicates a large number of wireless device flows.

Figure 11:
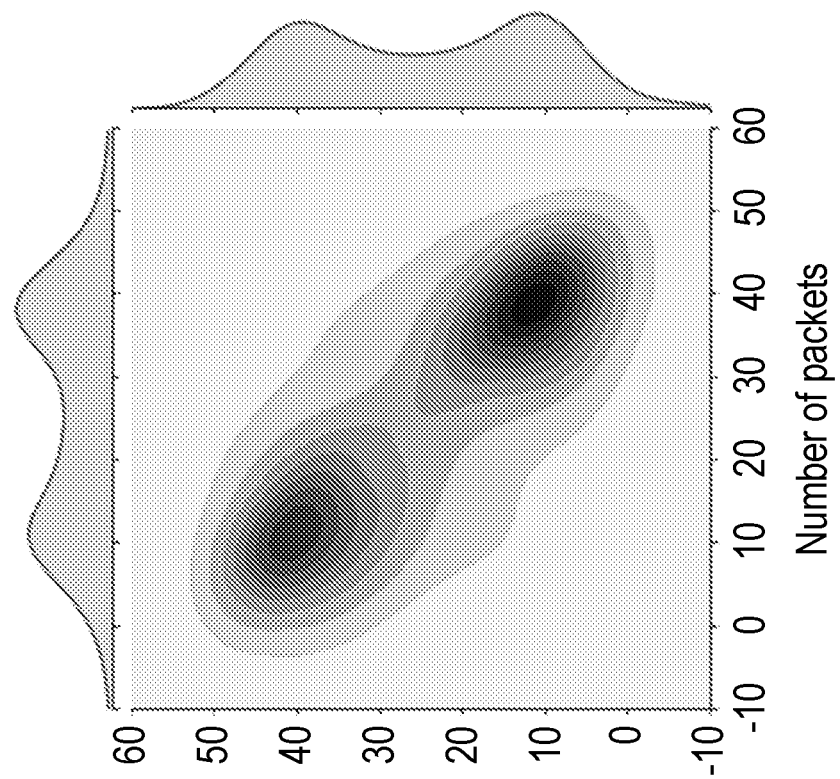
FIG. 11 illustrates a distribution generated by a VAE.

After training a VAE on the traffic distribution of FIG. 10, the resulting generated distribution $\hat{X}$ when feeding sampled z-values from a mean-0 and variance 1 Gaussian distribution into the trained VAE decoder are shown in FIG. 11, with dark colour indicating a higher probability of UE flow.

The number of measurements available for training may be based on preconfigured threshold, for example based on the memory limitations in the training node. When sufficient measurements have been collected, the node computes the VAE. How to determine if sufficient measurements have been gathered can for example be determined by when the VAE loss metric is lower than some threshold.

During execution, and in a scenario in which the first node is a wireless device, when the wireless device connects to the network, the serving node receives the VAE with associated information for the wireless device. The received information may comprise:

Sampling method/distribution for z latent space, typically a zero-mean Gaussian with variance 1. This may be indicated by the wireless device by signalling some flag (1/0), or preconfigured at the network that the wireless device is using a particular z-distribution. If the wireless device signals a 0 flag, it should provide the z-distribution it uses.

Loss from the trained VAE, both the reconstruction loss and the regularisation loss (for example KL-divergence loss).

Decoder layout with associated parameters (for example Neural Network weights)

Output features (packet size, number of packets, etc.)

As discussed above, the information can be signalled from the wireless device, or from some other node depending on the training location. In one example, if the information is signalled from the wireless device, the information may then forwarded and stored at a core node. When the wireless device next connects, the information can be retrieved from the core node, thus saving wireless device signalling.

Next, the serving node may then generate a predicted traffic distribution for the wireless device by feeding sampled values of z into the decoder d. The network may then use the traffic distribution denoted $d_{traffic}$ to perform network decisions, and the service node configures one of more radio resource parameters for the wireless device based on the traffic distribution.

In another example, the VAE may be trained as a common model over all the wireless devices in the system. For example, wireless devices can train local models on the flows for that wireless device only, and the models for different wireless devices can then periodically be aggregated in a network node and redistributed to the wireless devices. Each wireless device can then maintain an updated latent state that reflects the wireless device's traffic profile, i.e. the type of traffic that a wireless device is likely to have. When the wireless device connects to the system, the latent state can be sent to the network which can then enable appropriate features for the wireless device based on its traffic profile.

As mentioned above, the communication network can use the predicted traffic distribution generated by the VAE to activate features such as carrier aggregation or dual connectivity, for example if the wireless device has P packets above size S with a certain probability, where P and S are based on the signalling overhead associated with CA (or DC). If it is assumed that $d_{traffic}$ comprises the distribution according to FIG. 11, the network can estimate that it is most likely that the traffic from the wireless device will be in range of 10-40 packets, with size of 0-100 kB. In addition, the traffic is likely to fall into two different types, either 40 packets with size 10 kB, or 10 packets of size 40 kB. Using this information, the network can take decisions on whether or not to activate CA, DC or other features, and can configure radio resource parameters in the wireless device accordingly.

As discussed above, the methods 400 to 700 are performed by nodes, which may be core network nodes, radio access nodes or wireless devices. The present disclosure provides nodes which are adapted to perform any or all of the steps of the above discussed methods.

Figure 12:
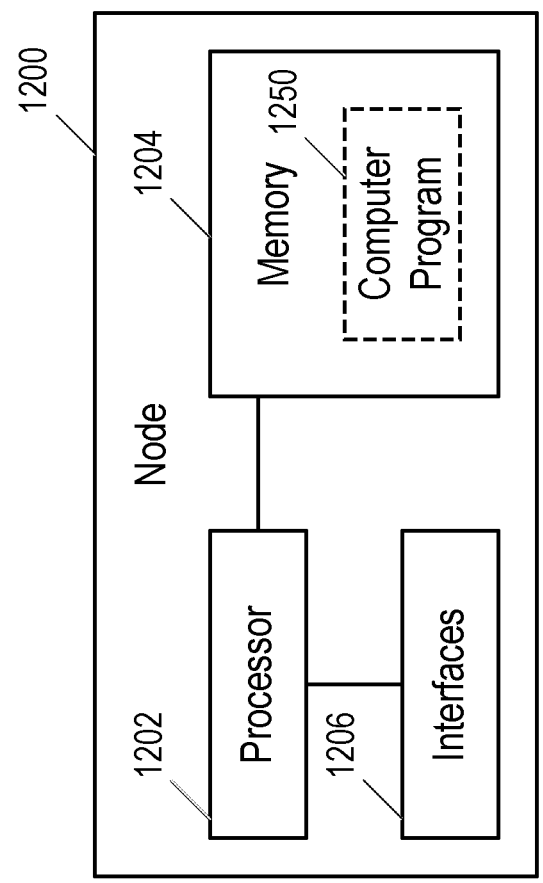
FIG. 12 is a block diagram showing functional modules in a node.

FIG. 12 is a block diagram illustrating an example node 1200 which may implement the method 400 and/or 600 according to examples of the present disclosure, for example on receipt of suitable instructions from a computer program 1250. Referring to FIG. 12, the node 1200 comprises a processor or processing circuitry 1202, and may comprise a memory 1204 and interfaces 1206. The processing circuitry 1202 is operable to perform some or all of the steps of the method 400 and/or 600 as discussed above with reference to FIGS. 4 and 6a to 6c. The memory 1204 may contain instructions executable by the processing circuitry 1202 such that the node 1200 is operable to perform some or all of the steps of the method 400 and/or 600. The instructions may also include instructions for executing one or more telecommunications and/or data communications protocols. The instructions may be stored in the form of the computer program 1250. In some examples, the processor or processing circuitry 1202 may include one or more microprocessors or microcontrollers, as well as other digital hardware, which may include digital signal processors (DSPs), special-purpose digital logic, etc. The processor or processing circuitry 1202 may be implemented by any type of integrated circuit, such as an Application Specific Integrated Circuit (ASIC), Field Programmable Gate Array (FPGA) etc. The memory 1204 may include one or several types of memory suitable for the processor, such as read-only memory (ROM), random-access memory, cache memory, flash memory devices, optical storage devices, solid state disk, hard disk drive etc.

Figure 13:
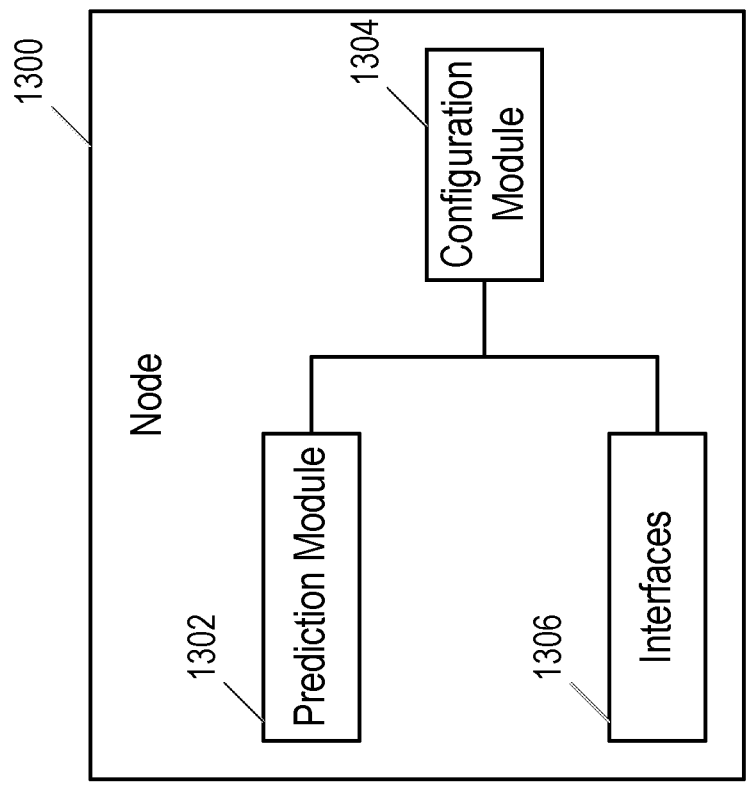
FIG. 13 is a block diagram showing functional modules in another example of node.

FIG. 13 illustrates functional modules in another example of node 1300 which may execute examples of the methods 400 and/or 600 of the present disclosure, for example according to computer readable instructions received from a computer program. It will be understood that the modules illustrated in FIG. 13 are functional modules, and may be realised in any appropriate combination of hardware and/or software. The modules may comprise one or more processors and may be integrated to any degree.

Referring to FIG. 13, the node 1300 is for managing a first node in a communication network, wherein the first node is operable to exchange traffic flows with other nodes in the communication network. The node 1300 comprises a prediction module 1302 for using a VAE to generate a predicted traffic distribution for the first node, wherein the VAE has been trained using information about historical data flows exchanged by the first node with at least one other node in the communication network. The node 1300 further comprises a configuration module 1304 for configuring at least one radio resource parameter of the first node based on the obtained predicted traffic distribution for the first node. The node may further comprise interfaces 1306.

Figure 14:
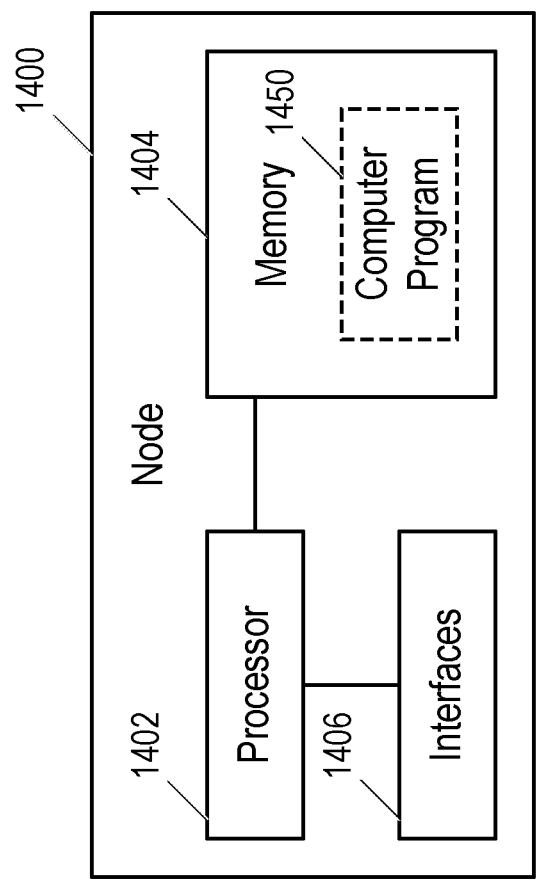
FIG. 14 is a block diagram showing functional modules in another example of node.

FIG. 14 is a block diagram illustrating an example node 1400 which may implement the method 500 and/or 700 according to examples of the present disclosure, for example on receipt of suitable instructions from a computer program 1450. Referring to FIG. 14, the node 1400 comprises a processor or processing circuitry 1402, and may comprise a memory 1404 and interfaces 1406. The processing circuitry 1402 is operable to perform some or all of the steps of the method 500 and/or 700 as discussed above with reference to FIGS. 5 and 7a and 7b. The memory 1404 may contain instructions executable by the processing circuitry 1402 such that the node 1400 is operable to perform some or all of the steps of the method 500 and/or 700. The instructions may also include instructions for executing one or more telecommunications and/or data communications protocols. The instructions may be stored in the form of the computer program 1450. In some examples, the processor or processing circuitry 1402 may include one or more microprocessors or microcontrollers, as well as other digital hardware, which may include digital signal processors (DSPs), special-purpose digital logic, etc. The processor or processing circuitry 1402 may be implemented by any type of integrated circuit, such as an Application Specific Integrated Circuit (ASIC), Field Programmable Gate Array (FPGA) etc. The memory 1404 may include one or several types of memory suitable for the processor, such as read-only memory (ROM), random-access memory, cache memory, flash memory devices, optical storage devices, solid state disk, hard disk drive etc.

Figure 15:
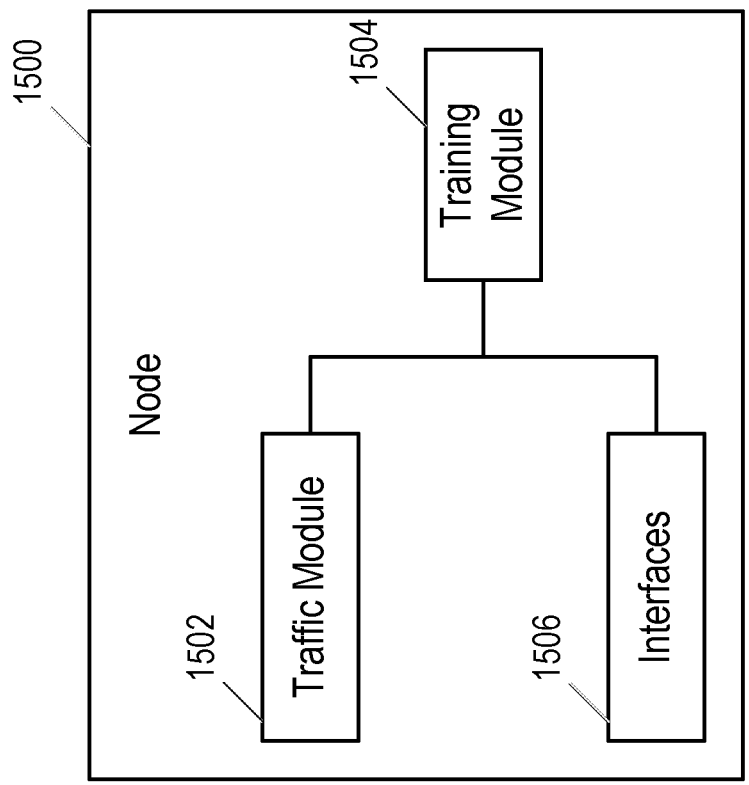
FIG. 15 is a block diagram showing functional modules in another example of node.

FIG. 15 illustrates functional modules in another example of node 1500 which may execute examples of the methods 500 and/or 700 of the present disclosure, for example according to computer readable instructions received from a computer program. It will be understood that the modules illustrated in FIG. 15 are functional modules, and may be realised in any appropriate combination of hardware and/or software. The modules may comprise one or more processors and may be integrated to any degree.

Referring to FIG. 15, the node 1500 is for facilitating management of a first node in a communication network, wherein the first node is operable to exchange traffic flows with other nodes in the communication network. The node 1500 comprises a traffic module 1502 for obtaining information about historical data flows exchanged by the first node with at least one other node in the communication network. The node 1500 further comprises a training module 1504 for using the obtained information to train a VAE to generate a predicted traffic distribution for the first node. The node 1500 may further comprise interfaces 1506.

Aspects of the present disclosure, as demonstrated by the above discussion, provide methods and nodes that involve the use of a VAE for generating the expected traffic for a node such as a wireless device or radio access node. Radio resource parameters for the node are then configured based on the expected traffic predicted by the VAE. In this manner, radio resources for a radio access node or wireless device can be efficiently setup prior to the start of data transmissions. For example CA, DC, CoMP etc. can be activated for only those wireless devices likely to have suitable traffic flow. Load balancing candidates can be selected, and beamforming parameters configured without waiting for a traffic observation period, leading to battery savings for the wireless device. It will be appreciated that according to examples of the present disclosure, a wireless device is not required to transmit its traffic history but only the trained VAE, thus preserving the privacy of the wireless device and reducing data storage in the network. The VAE can be used to generate multi-dimensional information about wireless device or radio access node traffic patterns in an efficient manner. The network can then generate an expected traffic distribution without needing to observe the traffic for several seconds, so reducing energy consumption of both wireless devices and their serving nodes.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method performed by a first node for managing a second node in a communication network, the second node being operable to exchange traffic flows with other nodes in the communication network, the method comprising:
   using a Variational Autoencoder, VAE, to generate a predicted traffic distribution for the second node, the second node being different from the first node, the VAE having been trained using information about historical data flows of the second node exchanged by the second node with at least one other node in the communication network; and
   configuring at least one radio resource parameter of the second node based on the obtained predicted traffic distribution for the second node.

2. The method as claimed in claim 1, wherein using a VAE to generate a predicted traffic distribution for the second node comprises:
   sampling values from a latent space of the VAE; and
   inputting the sampled values to a decoder part of the VAE.

3. The method as claimed in claim 1, further comprising:
   receiving a representation of the VAE from a node in the network, wherein the representation comprises:
      a sampling distribution for a latent space of the VAE; and
      parameters of a decoder part of the VAE.

4. The method as claimed in claim 1, further comprising:
   requesting from the second node metadata describing information stored by the second node about historical data flows of the second node exchanged by the second node with the at least one other node in the communication network; and
   receiving the requested metadata.

5. The method as claimed in claim 4, further comprising:
   setting at least one hyperparameter for the VAE on the basis of the received metadata; and
   requesting the second node to train a VAE according to the set at least one hyperparameter and using the information stored by the second node about historical data flows exchanged by the second node with the at least one other node in the communication network.

6. The method as claimed in claim 1, wherein the second node comprises a wireless device, and wherein configuring at least one radio resource parameter of the second node based on the obtained predicted traffic distribution for the second node comprises performing at least one of:
   activating carrier aggregation for the wireless device;
   activating dual connectivity for the wireless device;
   configuring at least one beamforming parameter for the wireless device;
   instructing the wireless device to perform a measurement for load balancing;
   activating Coordinated MultiPoint, CoMP, transmission for the wireless device;
   activating Combined Cell for the wireless device; or
   configuring a resource scheduling parameter for the wireless device.

7. The method as claimed in claim 1, wherein the second node comprises a radio access node, and wherein configuring at least one radio resource parameter of the second node based on the obtained predicted traffic distribution for the second node comprises performing at least one of:
   configuring a parameter for activation of at least one of carrier aggregation or dual connectivity for a wireless device connecting to the radio access node;
   configuring at least one beamforming parameter for a wireless device connecting to the radio access node;
   configuring a parameter for activation of Coordinated MultiPoint, CoMP, transmission for a wireless device connecting to the radio access node;
   configuring a parameter for activation of Combined Cell for a wireless device connecting to the radio access node; or
   configuring a resource scheduling parameter for a wireless device connecting to the radio access node.

8. The method as claimed in claim 1, further comprising:
   receiving a plurality of representations of VAEs from a plurality of nodes in the network, wherein each VAE has been trained by a node from which its representation was received using information about historical data flows exchanged by the node with at least one other node in the communication network;
   aggregating the represented VAEs to form a combined VAE; and
   sending a representation of the combined VAE to nodes in the communication network.

9. The method as claimed in claim 1, further comprising:
obtaining information about historical data flows exchanged by the second node with the at least one other node in the communication network; and
training the VAE using the obtained information.

10. The method as claimed in claim 9, further comprising:
setting at least one hyperparameter for the VAE on the basis of the obtained information; and
training the VAE according to the set at least one hyperparameter.

11. A method performed by a first node for facilitating management of a second node in a communication network, the second node being operable to exchange traffic flows with other nodes in the communication network, the method comprising:
obtaining information about historical data flows of the second node exchanged by the second node with at least one other node in the communication network; and
using the obtained information to train a Variational Autoencoder, VAE, to generate a predicted traffic distribution for the second node, the second node being different from the first node.

12. The method as claimed in claim 11, further comprising:
sending a representation of the VAE to a node in the network, wherein the representation comprises:
a sampling distribution for a latent space of the VAE; and
parameters of a decoder part of the VAE.

13. The method as claimed in claim 12, further comprising:
receiving a representation of a combined VAE from a node in the communication network; and
retraining the combined VAE using the obtained information about historical data flows exchanged by the second node with at least one other node in the communication network.

14. The method as claimed in claim 11, further comprising:
receiving from a node in the network a request for metadata describing information stored by the second node about historical data flows of the second node exchanged by the second node with at least one other node in the communication network; and
sending the requested metadata to the requesting node.

15. The method as claimed in claim 14, further comprising:
receiving from a node in the network a request to train a VAE according to at least one hyperparameter and using information stored by the second node about historical data flows of the second node exchanged by the second node with at least one other node in the communication network.

16. The method as claimed in claim 11, wherein using the obtained information to train a VAE to generate a predicted traffic distribution for the second node comprises:
configuring the VAE according to at least one hyperparameter;
inputting the obtained information to an encoder part of the VAE to generate an encoded distribution of the information;
inputting samples from the encoded distribution of the information to a decoder part of the VAE to generate a reconstructed version of the information;
calculating a loss function between the obtained information and the reconstructed version of the information, wherein the loss function comprises a reconstruction term and a regularisation term; and
optimising parameters of the VAE to minimise the loss function.

17. The method as claimed in claim 11, wherein the second node comprises at least one of a wireless device or a radio access node.

18. A first node for managing a second node in a communication network, the second node being operable to exchange traffic flows with other nodes in the communication network, the first node comprising processing circuitry configured to cause the first node to:
use a Variational Autoencoder, VAE, to generate a predicted traffic distribution for the second node, the second node being different from the first node, the VAE having been trained using information about historical data flows of the second node exchanged by the second node with at least one other node in the communication network; and
configure at least one radio resource parameter of the second node based on the obtained predicted traffic distribution for the second node.

19. A first node for facilitating management of a second node in a communication network, the second node being operable to exchange traffic flows with other nodes in the communication network, the first node comprising processing circuitry configured to cause the node to:
obtain information about historical data flows of the second node exchanged by the second node with at least one other node in the communication network; and
use the obtained information to train a Variational Autoencoder, VAE, to generate a predicted traffic distribution for the second node, the second node being different from the first node.

* * * * *